US008667090B2

(12) United States Patent
Chhabra et al.

(10) Patent No.: US 8,667,090 B2
(45) Date of Patent: Mar. 4, 2014

(54) DELIVERING A WEBPAGE TO A CLIENT

(75) Inventors: Anshul Chhabra, Saratoga, CA (US);
Akhil Aggrawal, Fremont, CA (US);
Justin L. Schwartz, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 497 days.

(21) Appl. No.: 12/961,744

(22) Filed: Dec. 7, 2010

(65) Prior Publication Data

US 2012/0143942 A1 Jun. 7, 2012

(51) Int. Cl.
*G06F 15/16* (2006.01)
(52) U.S. Cl.
USPC ........... 709/219; 715/705; 715/706; 715/760; 709/218
(58) Field of Classification Search
USPC ........... 709/203, 217–219; 715/705–706, 760
See application file for complete search history.

(56) References Cited

U.S. PATENT DOCUMENTS

| 7,475,089 | B1 * | 1/2009 | Geddes | 1/1 |
| 7,627,579 | B2 * | 12/2009 | Joines et al. | 1/1 |
| 2003/0187982 | A1 * | 10/2003 | Petit | 709/225 |
| 2004/0017395 | A1 * | 1/2004 | Cook | 345/745 |
| 2005/0010634 | A1 * | 1/2005 | Henderson et al. | 709/201 |
| 2006/0212798 | A1 * | 9/2006 | Lection et al. | 715/513 |
| 2006/0235942 | A1 * | 10/2006 | Gale et al. | 709/217 |
| 2010/0115432 | A1 * | 5/2010 | Arthurs et al. | 715/760 |

OTHER PUBLICATIONS

"Web 2.0 user interface features", WebSphere Portal, Express Version 6.1.0, Operating systems: i5/OS, Linux, Windows, 3 pages, Apr. 28, 2010.

* cited by examiner

*Primary Examiner* — Patrice Winder
*Assistant Examiner* — Eyob Hagos
(74) *Attorney, Agent, or Firm* — Baker Botts L.L.P.

(57) ABSTRACT

In certain embodiments, a server receives a request from a client for a webpage comprising portlets. A framework corresponding to the webpage is retrieved. The framework indicates whether a portlet is to be executed by the server or whether execution of the portlet is to be initiated by the client. The framework indicates that one or more first portlets are to be executed by the server. The server executes the first portlets to yield one or more first portlet markups. The first portlet markups are placed into the webpage. Execution of one or more second portlets is to be initiated by the client according to the framework. One or more placeholder tags for the second portlets are placed into the webpage. A placeholder tag allows the client to initiate execution of a second portlet. The webpage comprising the first portlet markups and the placeholder tags is sent to the client.

20 Claims, 3 Drawing Sheets

DELIVERING A WEBPAGE TO A CLIENT

TECHNICAL FIELD

The present disclosure relates generally to communications systems.

BACKGROUND

An application server may provide a webpage to a client. In certain situations, a webpage may include portlets. A portlet is a pluggable user interface software component that may be used to display, for example, email, weather reports, news applications, or other applications in a web page.

DESCRIPTION OF EXAMPLE EMBODIMENTS

Overview

In certain embodiments, a server receives a request from a client for a webpage comprising portlets. A framework corresponding to the webpage is retrieved. The framework indicates whether a portlet is to be executed by the server or whether execution of the portlet is to be initiated by the client. The framework indicates that one or more first portlets are to be executed by the server. The server executes the one or more first portlets to yield one or more first portlet markups. The one or more first portlet markups are placed into the webpage. Execution of one or more second portlets is determined to be initiated by the client according to the framework. One or more placeholder tags for the one or more second portlets are placed into the webpage. A placeholder tag allows the client to initiate execution of a second portlet. The webpage comprising the one or more first portlet markups and the one or more placeholder tags is sent to the client.

Description

Figure 1:
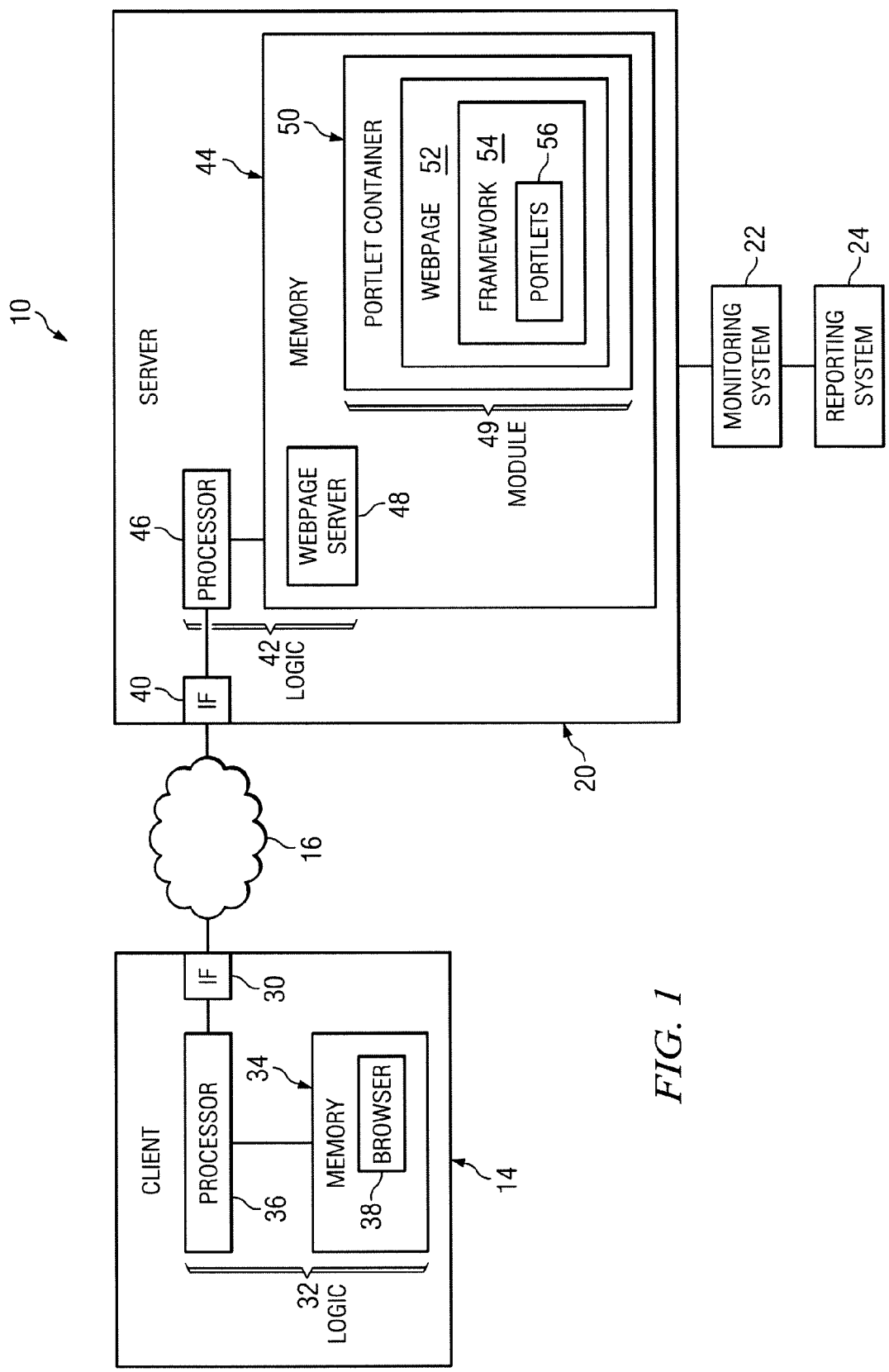
FIG. 1 illustrates an example of a system that includes a server that provides a webpage to a client.

FIG. 1 illustrates an example of a system 10 that includes a server 20 that provides a webpage 52 to a client 14. In certain embodiments, webpage 52 includes portlets 56 and a framework 54. Framework 54 includes parameters that indicate whether a portlet 56 is to be executed on the server side or the client side. For example, certain portlets 56 are executed on the server side, and other portlets 56 are executed on the client side to efficiently deliver webpage 52 to client 14. In certain cases, the parameters may be used to dynamically determine if a portlet 56 is to be executed on the server side or the client side.

In the illustrated example, system 10 includes a client 14, a communication network 16, a server 20, a monitoring system 22, and/or a reporting system 24 coupled as shown. Client 14 includes an interface 30, logic 32, and/or a memory 34. Logic 32 includes one or more processors 36 and/or one or more applications such as a browser 38. Server 20 includes an interface 40, logic 42, and/or one or more memories 44. Logic 42 includes one or more processors 46 and/or software application such as a web server 48. Memory 44 stores software applications and/or a webpage module 49. Webpage module 49 includes a portal container 50, a webpage 52, a framework 54, and/or one or more portlets 56.

In an example of operation, a request for webpage 52 is received at server 20 from client 14. Webpage 52 comprises a set of portlets 56. Framework 54 corresponding to webpage 52 is retrieved. Framework 54 indicates whether a portlet 56 is to be executed by server 20 or whether execution of the portlet 56 is to be initiated by client 14. In the example, framework 54 indicates that one or more first portlets 56 are to be executed at server 20. The first portlets 56 are executed at server 20 to yield one or more first portlet markups, and the first portlet markups are placed into webpage 52. The execution of one or more second portlets 56 is determined to be initiated by client 14 according to framework 54. One or more placeholder tags for the second portlets 56 are placed into webpage 52. A placeholder tag allows client 14 to initiate execution of a second portlet 56. Webpage 52 is sent to client 14. Webpage 52 comprises the one or more first portlet markups and the one or more placeholder tags. A request to execute at least one second portlet 56 is received from client 14. The second portlet 56 is executed to yield a second portlet markup, which is sent to client 14.

Client 14 displays webpage 52 on a display device. Examples of display devices include computer monitors, televisions, screens (such as cell phone screens), and instrument display panels. In certain embodiments, web browser 38 of client 14 may be a software application that retrieves, presents, and/or traverses information resources. The information resources may be on the World Wide Web (WWW) or web server 48. An information resource may be identified by a Uniform Resource Identifier (URI) and may be a webpage, image, video, or other content. A web browser may have a graphical user interface, for example, INTERNET EXPLORER, MOZILLA FIREFOX, CHROME, or OPERA web browsers, or a text-based interface, for example, LYNX or LINKS web browsers.

Communication network 16 may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

Server 20 provides content, such as webpage 52, to client 14. In certain embodiments, web server 48 of server 20 delivers, or serves, the content. Web server 48 may use HyperText Transfer Protocol (HTTP) over the WWW to deliver the content. Webpage 52 is a document that can be accessed through web browser 38 and displayed at client 14. In certain embodiments, webpage 52 may provide information in any suitable format, such as a HyperText Markup Language (HTML) or Extensible Hypertext Markup Language (XHTML) format, and may provide navigation to other webpages via hypertext links. A webpage 52 may have a top portion and a bottom portion when displayed at client 14, where the top portion is typically at the top of a display of client 14 and the bottom portion is typically at the bottom of the display.

In certain embodiments, web server 48 may deliver webpage 52 using a webpage module 49, which includes portal container 50, webpage 52, framework 54, and/or one or more portlets 56. In certain embodiments, portlet container 50 is a run time environment for portlets 56 in which portlets 56 may be instantiated, used, and/or destroyed.

In certain embodiments, framework 54 determines the appearance of a particular webpage 52. Framework 54 may determine how portlet markups are displayed in webpage 52. In certain embodiments, framework 54 may include a theme and/or skin. The theme may determine the global appearance of webpage 52. A theme may affect the navigational structure, banner, colors, fonts, portlet skins, and/or other visual elements of webpage 52. An example of a theme may be a Java Server Page (JSP) that serves dynamically generated webpages 52 based on HTML.

A skin (or wrapper) may designate how a portlet 56 is provided in webpage 52, for example, how the portlet markup of the portlet 56 is displayed in webpage 52. An example of a skin may be a JSP that is bundled with a portlet 56. A skin may wrap around portlet 56 and may be configured to perform any suitable operation, as described in more detail below.

In certain embodiments, A portlet 56 may be executed by executing the code of portlet 56 to yield the portlet markup. A portlet markup may be a markup (such as an HTML markup) that client 14 may use to render portlet 56 at client 14. In an example of operation, when request is received for a webpage 52, a theme of webpage 52 may call a container application programming interface (API) for invoking one or more portlets 56 of webpage 52. The API loops over each portlet 56 of webpage 52. For each portlet 56, the API calls a skin of portlet 56. The portlet skin may call a container API for invoking portlet 56. The container API calls a portlet method that generates a portlet markup for portlet 56.

In certain embodiments, framework 54 may indicate whether a portlet 56 is to be executed server-side or client-side. In certain embodiments, server-side execution may mean that portlet 56 is to be executed by server 20. In server-side execution, server 20 executes portlet 56 to yield a portlet markup and inserts the portlet markup into webpage 52 to be sent to client 14. In certain embodiments, client-side execution may mean that execution of the portlet is to be initiated by client 14. In client-side execution, server 20 inserts a placeholder tag into webpage 52 to be sent to client 14. The placeholder tag may include an identifier that client 14 can use to request execution of portlet 56 by server 20 to yield a portlet markup that can be returned to client 14. Any suitable tag may be used, for example, a J-code tag that uses an URI as identifier used to request execution.

In certain embodiments, skins may measure the elapsed time of webpage 52 and/or portlet 56, which may be used to determine whether to execute a portlet 56 server-side or client-side. In the embodiments, a skin may measure a webpage elapsed time from the start of building webpage 52. In the embodiments, a skin may measure a portlet elapsed time of a portlet 56 from the start of execution of portlet 56. A skin may use any suitable monitoring framework to measure webpage and/or portlet elapsed time, for example, the Java Application Monitor (JAMon) monitoring framework. In certain embodiments, skins may report measurements of webpage 52 and/or portlet 56 to monitoring system 22.

The portlet elapsed time from the start of execution of portlet 56 to the end of execution of portlet 56 may yield an execution time for portlet 56, the time it takes for portlet 56 to execute. The measured portlet execution time may be used to calculate (by a skin or monitoring system 22) other types of execution time of a portlet 56, such as a historical execution time or a predicted execution time. The historical execution time may describe previously measured execution times, and may be calculated from a set of measured portlet execution times in any suitable manner. For example, a mathematical function (such as an average or maximum function) may be applied to the set of execution times to yield the historical execution time (such as an average or maximum portlet execution time). The set of execution times may be measured over an suitable period of time, such as 1 to 5, 5 to 10, or greater than 10 days.

The predicted execution time may be used to predict when a portlet 56 will finish execution, and may be calculated in any suitable manner. For example, the predicted execution time may be calculated from a mathematical function (such as an sum function) applied to a webpage elapsed time and a historical execution time. For example, the predicted execution time may be the sum of a webpage elapsed time and the average portlet execution time.

In certain embodiments, a skin may load one or more of any suitable parameters into a portlet 56. Portlet 56 then uses the loaded parameters for execution. In certain embodiments, a parameter may be used determine if portlet 56 should be executed server-side or client-side. Examples of these parameters include a forced server parameter, a forced client parameter, a page threshold, a portlet threshold, a historical portlet threshold, and/or an enable/disable parameter. In these cases, portlet 56 reads the loaded parameters to determine if portlet 56 should be executed server-side or client-side.

A forced server parameter indicates that a portlet 56 is to be executed server-side. Any suitable portlet 56 may have a forced server parameter. For example, a portlet 56 that has a relatively short execution time, such as less than a server-side execution threshold, may have a forced server parameter. A server-side execution threshold may have any suitable value, for example, a value in the range of less than 3 seconds or 3 to 5 seconds. As another example, a portlet 56 that is located at the top of webpage 52 may have a forced server parameter to allow the top of webpage 52 to be displayed before the bottom of webpage 52.

A forced client parameter indicates that a portlet 56 is to be executed client-side. Any suitable portlet 56 may have a forced client parameter. For example, a portlet 56 that has a relatively long execution time, such as greater than a client-side execution threshold, may have a forced server parameter. A client-side execution threshold may have any suitable value, for example, a value in the range of 10 to 12 seconds or greater than 12 seconds. As another example, a portlet 56 that is designed to be executed by client 14 may have a forced client parameter.

A webpage threshold indicates a maximum amount of time for server-side execution of webpage 52 to build webpage 52. In certain examples, if a webpage elapsed time for server-side execution exceeds the webpage threshold, then webpage 52 is sent from server 20 to client 14 and unexecuted portlets 56 are executed client-side. In certain examples, if a predicted execution time for executing a portlet 56 exceeds a webpage threshold, then portlet 56 is designated for client-side execution. The webpage threshold may have any suitable value, for example, a value in a range of 2 to 5, 5 to 10, or greater than 10 seconds.

A portlet threshold indicates a maximum amount of time for server-side execution of portlet 56. If a portlet elapsed time and/or portlet execution time (historical or predicted) for a portlet 56 exceeds the portlet threshold, then portlet 56 is executed client-side. A portlet threshold may have any suitable value, for example, a value in a range of 1 to 2, 2 to 3, 3 to 5, or greater than 5 seconds. Different portlets 56 may or may not have different portlet thresholds. In certain embodiments, sets of portlets 56 may have different portlet thresholds. For example, a set of portlets 56 at the top of webpage 52 may have a higher threshold than a set of portlets 62 at the bottom of webpage 52.

A historical portlet threshold indicates a maximum amount of time for a historical execution time for server-side execution of portlet 56. If the historical execution time for portlet 56 exceeds the historical portlet threshold, then portlet 56 may be disabled or designated for client-side execution. An enable/disable parameter may be used to indicate whether a portlet 56 is enabled or disabled. The enable/disable parameter may be set in response to a determination (as previously described) or in response to an instruction provided by a user.

A portlet 56 may be a pluggable user interface software component that may be managed and displayed in a web portal. In certain embodiments, portlet 56 may produce fragments of markup code that may be aggregated into webpage 52. Webpage 52 may be displayed as a set of non-overlapping portlet windows, where each portlet window displays a portlet 56. Any suitable web application can be a portlet 56. Examples of portlet applications include email, weather reports, discussion forums, and news portlet applications. Examples of portlets include IBM portlets and Java Specification Request (JSR) 168 and 286 portlets.

Monitoring system 22 monitors the performance of server 20. In certain embodiments, monitoring system 22 monitors measurements made by skins, such as the building of webpage 52 and/or the execution of portlets 56. Monitoring system 22 may record historical data of the measurements. Reporting system 24 may be used to report the performance monitored by monitoring system 22 to a user. Reporting systems 24 may also receive instructions from a user to, for example, change a parameter.

Parameters may be changed in response to measurements made by skins. In certain cases, monitoring system 22 may automatically change parameters in response to the measurements. In other cases, the measurements may be reported to a user, who may instruct server 20 to change parameters of framework 54.

As an example, changes may be made in response to the historical execution time of a portlet 56. A portlet 56 that has a historical execution time that is less than a server-side threshold may be regarded as executing quickly enough to be given a forced server parameter. A portlet 56 that had a historical execution time that is greater than a client-side execution threshold may be regarded as executing too slowly and may be given a forced client parameter.

Figure 2:
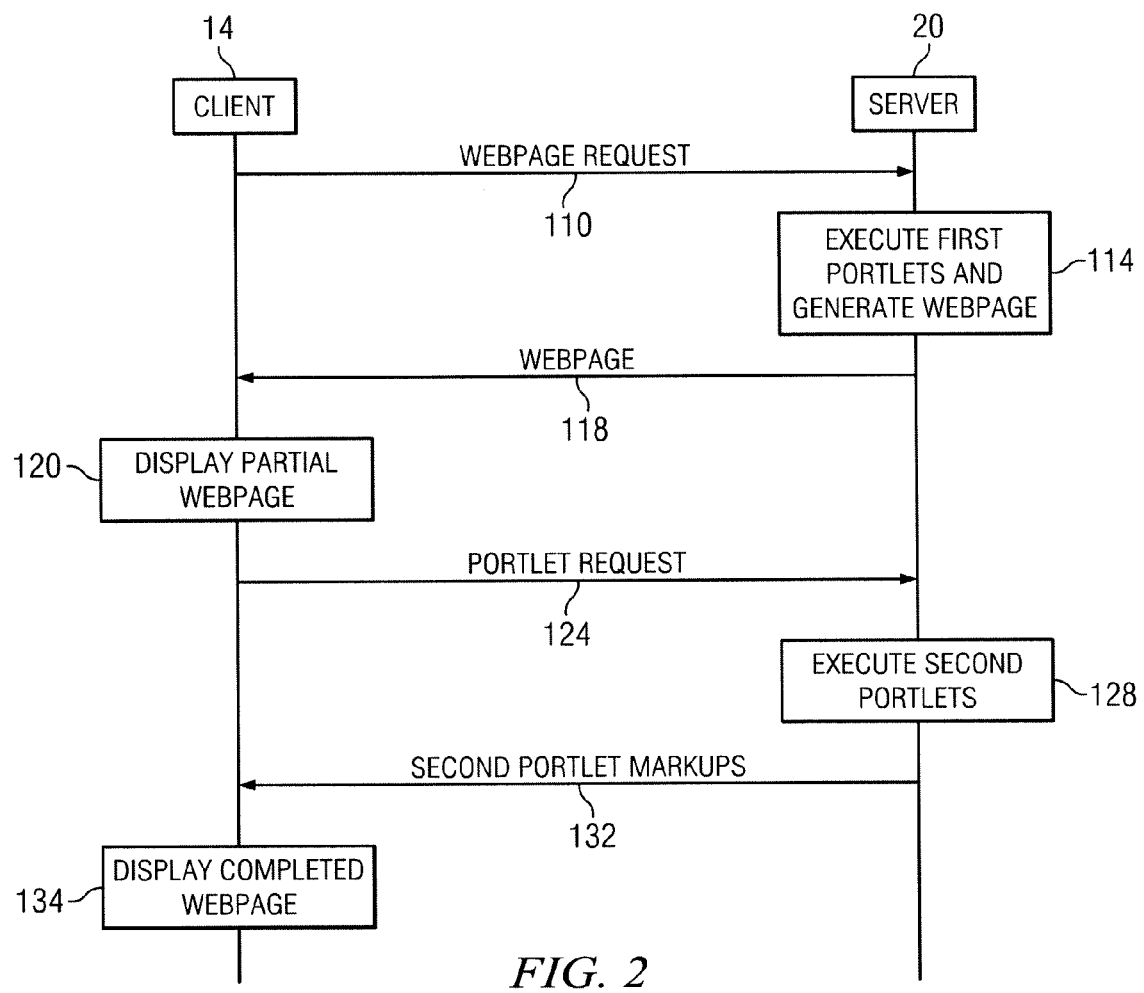
FIG. 2 illustrates an example of a method for requesting and providing a webpage.

FIG. 2 illustrates an example of a method for requesting and providing webpage 52. Certain details of the method may be included in the description of FIG. 3. The method starts at step 110, where client 14 sends a webpage request to server 20. Webpage 52 comprises a set of portlets 56. The request may be an aggregated request that requests execution of the set of portlets 56.

Server 20 executes first portlets 56 and generates webpage 52 at step 114. The first portlets 56 may be executed to yield one or more first portlet markups. A portlet 56 may be executed by executing the code of portlet 56 to yield the portlet markup. A portlet markup may be a markup (such as an HTML markup) that client 14 may use to render portlet 56 at client 14. The first portlet markups may be placed into webpage 52. For example, server 20 may place the first portlet markups into portlet windows of framework 54 designated for first portlets 56. In addition, server 20 may determine that one or more second portlets 56 are to be executed at client 14. Placeholder tags for the second portlets 56 may be placed into webpage 52. For example, server 20 may place the placeholder tags into portlet windows of framework 54 designated for second portlets 56.

Server 20 sends webpage 52 to client 14 at step 118. Client 14 displays partial webpage 52 at step 120. For example, client 14 may display the first portlet markups, but may not have a display for second portlets 56. Client 14 sends portlet requests to request execution of second portlets 56 to server 20 at step 124. A portlet request may be used to request execution of a particular portlet 56 and may comprise any suitable message such as an Ajax call.

Server 20 executes second portlets 56 in response to the portlet requests to yield second portlet markups at step 128. Server 20 sends second portlet markups to client 14 at step 132. Client 14 displays the completed webpage 52 at step 143. For example, client 14 may display the first portlet markups and the second portlet markups. The method then ends.

Figure 3:
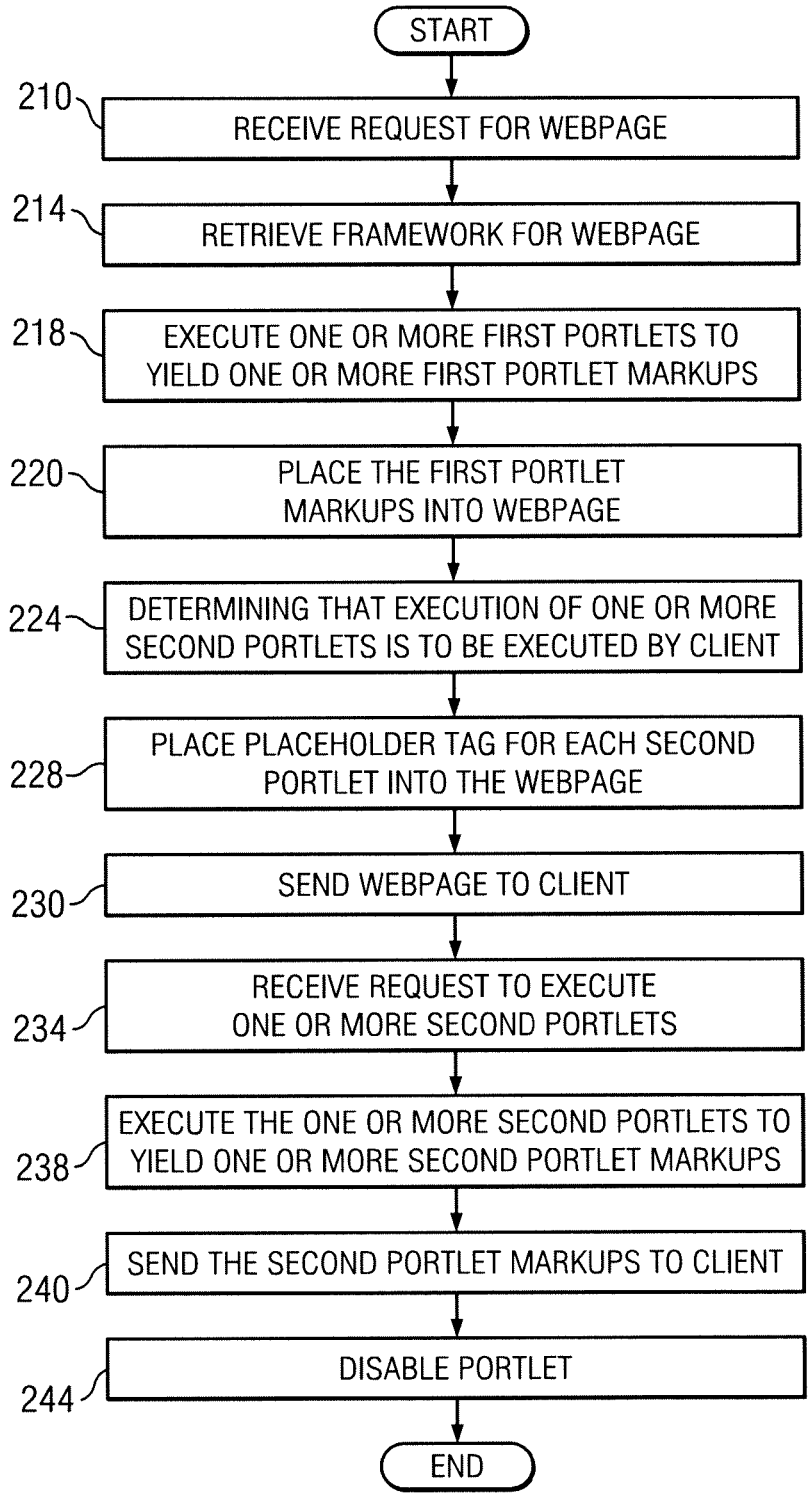
FIG. 3 illustrates an example of a method for providing a webpage to a client.

FIG. 3 illustrates an example of a method for providing webpage 52 to client 14. The method may be performed by server 20. The method starts at step 210, where a request for webpage 52 with a set of portlets 56 is received from client 14. A framework 54 corresponding to the webpage is retrieved at step 214. Framework 54 indicates whether a portlet 56 is to be executed by server 20 or whether execution of the portlet 56 is to be initiated by client 14. In the example, framework 54 indicates that one or more first portlets 56 are to be executed at server 20. In certain cases, a first portlet 56 may have a forced server parameter that indicates that the portlet 56 is to be executed on the client side. In other cases, a first portlet 56 may be dynamically designated for client-side execution. For example, the portlet elapsed and/or execution times may satisfy webpage and/or portlet thresholds. The first portlets are executed at server 20 to yield one or more first portlet markups at step 218. The first portlet markups are placed into webpage 52 at step 220.

The execution of one or more second portlets is determined to be initiated by client 14 according to framework 54 at step 224. A second portlet 56 may be designated to be executed client-side in any suitable manner. As an example, second portlet 56 may have a forced client parameter that indicates that second portlet 56 is to be executed client-side. As another example, an elapsed time for building webpage 52 may have exceeded a page threshold, but second portlet 56 may not have started or completed execution. As another example, an elapsed time and/or a historical execution time for executing second portlet 56 may have exceeded a webpage and/or portlet threshold. As another example, a predicted execution time for executing second portlet 56 may exceed a webpage and/or portlet threshold.

One or more placeholder tags for the second portlets are placed into webpage 52 at step 228. A placeholder tag allows client 14 to initiate execution of a second portlet 56. For example, a placeholder tag may include a URI that client can use to request execution of second portlet 56. Webpage 52 is sent to client 14 at step 230. Webpage 52 comprises the one or more first portlet markups and the one or more placeholder tags.

A request to execute at least one second portlet is received from client 14 at step 234. The second portlet is executed to yield a second portlet markup at step 238. The second portlet markup is sent to client 14 at step 240.

A portlet 56 is disabled at step 244. Portlet 56 may be disabled in response to any suitable action. As an example, if a historical execution time for executing a third portlet 56 has exceeded a historical portlet threshold for the third portlet 56, third portlet 56 may be disabled. As another example, server 20 may disable third portlet 56 in response to receiving an instruction to disable third portlet 56. The instruction may be provided by, for example, a user. Third portlet 56 may be disabled in any suitable manner. For example, an enable/disable parameter of third portlet 56 may be set to disable third portlet 56. The method then ends.

Modifications, additions, or omissions may be made to the systems and apparatuses disclosed herein without departing from the scope of the invention. The components of the systems and apparatuses may be integrated or separated. More-over, the operations of the systems and apparatuses may be performed by more, fewer, or other components. For example, the operations of server 20 may be performed by more than one component. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor (or "processing device"), may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more non-transitory, tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Components of the systems and apparatuses disclosed may be coupled by any suitable communication network. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
   receiving, at a server, a request from a client for a webpage, the webpage comprising a plurality of portlets;
   retrieving a framework corresponding to the webpage the framework indicating whether a portlet is to be executed by the server or whether execution of the portlet is to be initiated by the client, the framework indicating that one or more first portlets are to be executed by the server;
   executing, by the server, the one or more first portlets to yield one or more first portlet markups;
   placing the one or more first portlet markups into the webpage;
   determining that execution of one or more second portlets is to he initiated by the client according to the framework;
   placing one or more placeholder tags for the one or more second portlets into the webpage, a placeholder tag allowing the client to initiate execution of a second portlet; and
   sending the webpage comprising the one or more first portlet markups and the one or more placeholder tags to the client.

2. The method of claim 1, further comprising:
   receiving a request to execute at least one second portlet;
   executing the at least one second portlet to yield at least one second portlet markup; and
   sending the at least one second portlet markup to the client 3. The method of claim 1, a placeholder tag comprising an identifier that the client can use to request execution of a second portlet.

4. The method of claim 1, the framework comprising a skin for a particular portlet, the skin configured to load one or more parameters into the particular portlet, the skin configured to measure an elapsed time from a start of execution of the particular portlet.

5. The method of claim 1:
   further comprising determining that a first portlet is to be executed by the server according to a forced server parameter of the framework; and
   wherein the determining that execution of one or more second portlets is to be initiated by the client comprises:
      determining that a second portlet is to be executed by the client according to a forced client parameter of the framework.

6. The method of claim 1, the determining that execution of one or more second portlets is to be initiated by the client comprising:
   determining that a webpage elapsed time for building the webpage has exceeded a webpage threshold;
   determining that the one or more second portlets have not been executed; and
   designating that execution of the one or more second portlets is to be initiated by the Client.

7. The method of claim 1, the determining that execution of one or more second portlets is to be initiated by the client comprising:
   determining the following for at least one second portlet of the one or more second portlets:
      determining that a portlet elapsed time for executing the at least one second portlet has exceeded a threshold; and
      designating that the each second portlet is to be executed by the client.

8. The method of Claim 1, the determining that execution of one or more second portlets is to be initiated by the client comprising:

determining the following for at least one second portk.t of the one or more second portlets:
   determining that a predicted execution time of the at least one second portlet exceeds a threshold; and
   designating that the each second portlet is to be executed by the client.

9. The method of claim 1, further comprising:
determining that a historical execution time for executing one or more third portlets has exceeded a historical portlet threshold; and
disabling the one or more third portlets.

10. The method of claim 1, further comprising:
receiving an instruction to disable a third portlet; and
setting an enable/disable parameter of the framework to disable the third portlet.

11. One or more non-transitory computer readable media when executed by one or more processors configured to:
   receive, at a server, a request from a client for a webpage, the webpage comprising a plurality of portlets;
   retrieve a framework corresponding to the webpage, the framework indicating whether a portlet is to be executed by the server or whether execution of the portlet is to be initiated by the client, the framework indicating that one or more first portlets are to be executed by the server;
   execute, by the server, the one or more first portlets to yield one or more first portlet markups;
   place the one or more first portlet markups into the webpage;
   determine that execution of one or more second portlets is to be initiated by the client according to the framework;
   place one or more placeholder tags for the one or more second portlets into the webpage, a placeholder tag allowing the client to initiate execution of a second portlet; and
   send the webpage comprising the one or more first portlet markups and the one or more placeholder tags to the client.

12. The media of claim 11, further configured to:
receive a request to execute at least one second portlet;
execute the at least one second portlet to yield at least one second portlet markup; and
send the at least one second portlet markup to the client.

13. The media of claim 11, a placeholder tag comprising an identifier that the client can use to request execution of a second portlet.

14. The media of claim 11, the framework comprising a skin for a particular portlet, the skin configured to load one or more parameters into the particular portlet, the skin configured to measure an elapsed time from a start of execution of the particular portlet.

15. The media of claim 11:
further configured to determine that a first portlet is to be executed by the server according to a forced server parameter of the framework; and
wherein the determining that execution of one or more second portlets is to be initiated by the client comprises:
   determining that a second portlet is to be executed by the client according to a forced client parameter of the framework.

16. An apparatus comprising:
one or more memory devices comprising one or more instructions for execution by one or more processing devices; and
the processing devices, when executing the instructions, operable to:
   receive a request from a client for a webpage, the webpage comprising a plurality of portlets; and
   retrieve a framework corresponding to the webpage, the framework indicating whether a portlet is to be executed by the server or whether execution of the portlet is to be initiated by the client, the framework indicating that one or more first portlets are to be executed by the server;
   execute the one or more first portlets to yield one or more first portlet markups;
   place the one or more first portlet markups into the webpage;
   determine that execution of one or more second portlets is to be initiated by the client according to the framework;
   place one or more placeholder tags for the one or more second portlets into the webpage, a placeholder tag allowing the client to initiate execution of a second portlet; and
   send the webpage comprising the one or more first portlet markups and the one or more placeholder tags to the client.

17. The apparatus of claim 16, the processing devices further configured to:
receive a request to execute at least one second portlet;
execute the at least one second portlet to yield at least one second portlet markup; and
send the at least one second portlet markup to the client.

18. The apparatus of claim 16, a placeholder tag comprising an identifier that the client can use to request execution of a second portlet.

19. The apparatus of claim 16, the framework comprising a skin for a particular portlet, the skin configured to load one or more parameters into the particular portlet, the skin configured to measure an elapsed time from a start of execution of the particular portlet.

20. The apparatus of claim 16:
the processing devices further configured to determine that a first portlet is to be executed by the server according to a forced server parameter of the framework; and
wherein the determining that execution of one or more second portlets is to be initiated by the client comprises:
   determining that a second portlet is to be executed by the client according to a forced client parameter of the framework.

* * * * *